United States Patent [19]

Steele

[11] Patent Number: 5,295,812

[45] Date of Patent: Mar. 22, 1994

[54] ELECTROMAGNETIC CLUTCH AND PULLEY BEARING ARRANGEMENT

[75] Inventor: Duane F. Steele, Onsted, Mich.

[73] Assignee: Ford Motor Company, Dearborn, Mich.

[21] Appl. No.: 1,609

[22] Filed: Jan. 7, 1993

[51] Int. Cl.⁵ .................. F04C 29/00; F04B 49/02; F16D 27/112
[52] U.S. Cl. ........................... 418/55.1; 418/69; 417/223; 192/84 C
[58] Field of Search .................. 418/55.1, 69; 417/223; 192/84 C

[56] References Cited

U.S. PATENT DOCUMENTS

| | | | |
|---|---|---|---|
| 3,088,567 | 5/1963 | Fischer et al. | 192/84 C |
| 3,269,200 | 8/1966 | Vaughn et al. | 74/230.17 |
| 3,361,238 | 1/1968 | Yokel | 192/84 C |
| 3,415,347 | 12/1968 | Wrensch | 192/84 R |
| 3,675,747 | 7/1972 | Obermark | 192/48.2 |
| 3,743,068 | 7/1973 | Westervelt et al. | 192/84 C |
| 4,488,627 | 12/1984 | Streich et al. | 192/48.2 |
| 4,566,574 | 1/1986 | Marshall | 192/84 C |
| 4,718,526 | 1/1988 | Koitabashi | 192/35 |
| 4,909,369 | 3/1990 | Bausch | 192/84 C |

FOREIGN PATENT DOCUMENTS

| | | | |
|---|---|---|---|
| 702470 | 1/1965 | Canada | 192/84 C |
| 0065923 | 12/1982 | European Pat. Off. | 192/84 C |
| 1319912 | 1/1963 | France | 192/84 C |
| 1322039 | 2/1963 | France | 192/84 C |
| 54-45444 | 4/1979 | Japan | 192/84 C |
| 55-119228 | 9/1980 | Japan | 192/84 C |
| 55-119229 | 9/1980 | Japan | 192/84 C |
| 57-22423 | 2/1982 | Japan | 192/84 A |
| 57-43029 | 3/1982 | Japan | 192/84 C |
| 57-204331 | 12/1982 | Japan | 192/84 C |
| 59-47538 | 3/1984 | Japan | 192/84 C |
| 59-115494 | 7/1984 | Japan | 417/223 |
| 59-226721 | 12/1984 | Japan | 192/84 C |

Primary Examiner—John J. Vrablik
Attorney, Agent, or Firm—Roger L. May; Raymond L. Coppiellie

[57] ABSTRACT

An automobile vehicle air conditioning compressor adapted to be driven by a vehicle engine crankshaft through a drive pulley torque transfer mechanism wherein an electromagnetic clutch engagement plate is carried by the pulley and wherein a companion friction disc of an electromagnetic clutch is journalled on the compressor housing, the pulley being journalled on the compressor drive hub at a location axially spaced from the electromagnetic clutch thereby permitting the diameter of the clutch to be varied as desired.

3 Claims, 2 Drawing Sheets

ELECTROMAGNETIC CLUTCH AND PULLEY BEARING ARRANGEMENT

TECHNICAL FIELD

My invention relates generally to refrigerant compressors for use in an automotive vehicle air conditioning system and to improvements in a drive pulley and electromagnetic clutch assembly for establishing and disestablishing torque delivery from a vehicle engine to a rotor shaft for the compressor.

BACKGROUND OF THE INVENTION

My invention relates generally to the subject matter disclosed in my copending application Ser. No. 001,600, filed Jan. 7, 1993, entitled "Scroll-Type Compressor Having Unidirectional Rotor". That application is assigned to the assignee of my present invention.

It is common practice in the refrigerant compressor art to mount within a fixed housing compressor pumping elements. The pumping elements may be in the form of axially movable compressor pistons driven by a rotary swashplate or a pair of involute scrolls that cooperate, one with respect to the other, to define a pair of pressure chambers. The swashplate in the case of an axially movable piston-type compressor, or the movable scroll in the case of a scroll-type compressor, is driven by a torque input driveshaft journalled at one end of the compressor housing. This normally requires the compressor housing to be formed with a stationary nose or mounting sleeve. A shaft bearing is mounted within an internally machined bearing pocket in the stationary sleeve. An inboard bearing also is provided for the rotor, thereby providing a straddle mounting for the shaft.

The bearing sleeve normally is provided with an externally machined bearing mounting surface for the purpose of supporting a rotary pulley hub. The pulley is driven by a belt that encircles a drive pulley connected to the engine crankshaft of a vehicle engine in the case of an automotive-type air conditioning system.

An electromagnetic clutch usually is mounted within the pulley, and the hub of the pulley acts as a core for electromagnetic clutch coil windings.

A clutch engagement plate is resiliently connected for axial shifting movement on the driveshaft in close proximity to a clutch plate having a friction surface carried by the pulley hub.

When the electromagnetic clutch is engaged, the engagement plate is brought into frictional driving engagement with respect to the pulley so that pulley torque can be distributed to the torque input driveshaft. When the electromagnetic clutch is disengaged, the engagement plate and the driveshaft to which it is connected are deactivated and remain stationary while the pulley continues to be driven by the engine crankshaft.

It has been found that this pulley and bearing arrangement is complex and costly because of the difficult machining operations that are required to maintain concentricity between the bearing for the driveshaft and the bearing for the pulley, the latter being radially disposed with respect to the former. This makes it difficult for such prior art compressors of a given capacity to be adapted for various engine sizes because the bearing arrangement and the electromagnetic clutch windings do not accommodate pulleys of various sizes.

BRIEF DESCRIPTION OF THE INVENTION

My invention is distinguishable from prior art compressors of the kind previously described since the pulley and the clutch structure are not radially disposed, one with respect to the other. Rather, they are axially positioned in side-by-side relationship in a compact arrangement on one end of the compressor housing. The bearing arrangement adapts itself for simplified machining operations since only two external bearing mounting surfaces are needed. The necessity for maintaining precise machining tolerances to achieve concentricity of the bearings is not a critical problem with my improved design.

The pulley in my improved design is journalled on a bearing supported by a drive hub that is splined directly to the driveshaft. The hub, in turn, is journalled on an independent bearing that is located and supported by a stationary sleeve on the compressor housing. A radial clutch friction member is secured to the hub and rotates with the driveshaft. A clutch engagement plate is carried by the pulley and is continuously driven by the engine, regardless of whether the clutch is engaged or disengaged.

PARTICULAR DESCRIPTION OF THE INVENTION

Figure 1:
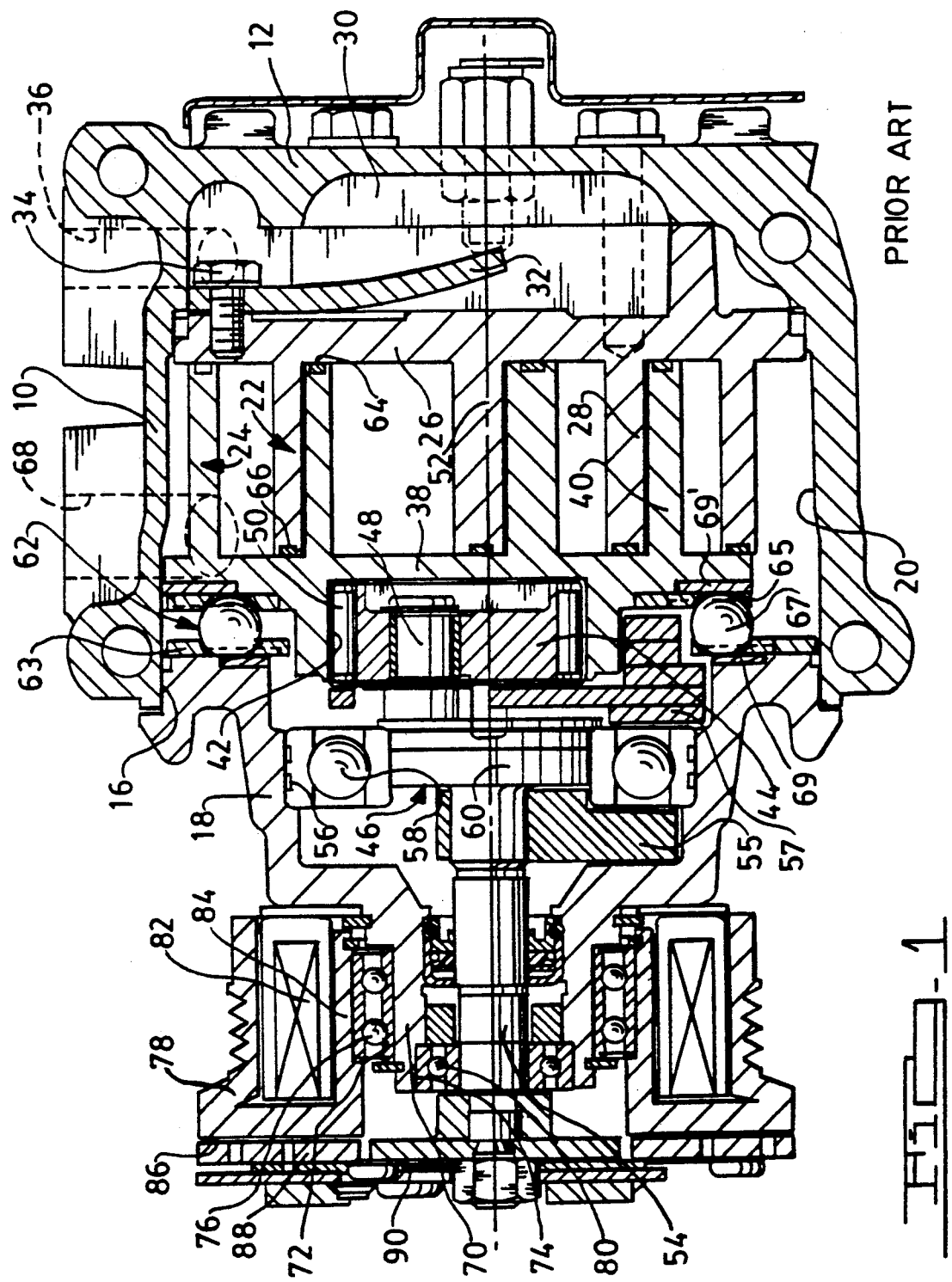
FIG. 1 shows a compressor and a clutch in a pulley assembly of the kind presently known in the prior art.

For the purpose of describing a prior art arrangement to which the improved clutch and bearing assembly of my invention can be applied, I will describe first a scroll-type compressor as shown in FIG. 1.

The prior art compressor of FIG. 1 comprises a cast aluminum housing 10 having a generally cylindrical shape and a closed end portion 12. The housing 10 is open, as shown at 16. A bearing support end plate 18 is received within the opening 16 and is held in place by suitable fastening means, not illustrated.

A pair of scrolls is disposed in the interior compressor cavity 20. This includes a fixed scroll 22 and a relatively movable scroll 24. Fixed scroll 22 includes a scroll disc portion 26 and a refrigerant pumping portion 28 that comprises multiple wraps with surfaces that conform to the shape of an involute of a circle. A discharge port (not shown in FIG. 1) is located generally on the axis of the fixed scroll 22. That port communicates with a high pressure refrigerant pressure chamber 30 located between disc portion 26 and the end portion 12 of the housing 10.

A movable valve element 32, secured to the scroll disc portion 26, is adapted normally to close the high pressure port. It is a flexible valve element that is anchored by a retainer bolt 34 secured to the scroll disc portion 26. Valve element 32 functions as a one-way flow valve that becomes unseated when the pressure in the pumping chambers of the scrolls reaches the discharge pressure in chamber 30. A pressure distributor port, shown with phantom lines at 36, communicates with the pressure chamber 30.

The movable scroll 24 comprises end disc portion 38 and pumping portion 40. The pumping portion 40 comprises multiple involute wraps that are nested with the wraps of the fixed scroll 22. As in the case of the fixed scroll 22, the wraps of the movable scroll 40 are shaped in the form of an involute of a circle. The involute surfaces of the fixed scroll contact involute surfaces of the movable scroll at tangent points. A pair of pumping chambers is defined by the registering wraps of the scrolls, the extent of the pumping chambers being defined by the locations of the tangent points.

A bearing pocket 42 in the scroll end disc portion 38 receives a coupling compliant disc portion 44 of anti-rotation ball coupling identified generally by reference character 46.

The ball coupling 46 includes a crank pin 48 journalled within the disc portion 44, the latter having a cylindrical outer surface that is journalled within the pocket 42 by means of roller bearings 50. The crank pin 48 is situated in offset relationship with respect to the axis of the fixed scroll, the axis being identified in FIG. 1 by reference numeral 52.

The coupling disc portion is provided with means, not shown, for effecting limited lost angular adjustment of the movable scroll relative to portion 44. This will facilitate passage of an occasional liquid slug of refrigerant through the compressor.

The crank portion 48 is connected drivably to compressor driveshaft 54, which is journalled in bearing opening 56 formed in plate 18. A journal for the shaft 54 includes ball bearing 58 having an inner race that registers with cylindrical bearing portion 60 carried by the driveshaft 54. A counterweight 55 is carried by driveshaft 54 at a location 180° displaced from crank portion 48. Another counterweight 57 is located in the opposite side of bearing 58.

For an understanding of the mode of operation of the scroll compressor illustrated in FIG. 1, reference may be made to my copending patent application identified above, which is assigned to the assignee of my present invention.

An anti-rotation roller thrust bearing assembly 62 is disposed between the scroll disc portion 38 and the end plate 18. This axially positions the movable scroll and accommodates any axial thrust acting on the movable scroll. It also prevents relative angular movement of the scrolls as the movable scroll follows an orbital path. The ends of the wraps for the movable scroll are sealed with respect to the disc portion 26 of the fixed scroll by a running seal 64. Similarly, a seal 66 is located between the ends of the wraps of the fixed scroll and the adjacent surface of the disc portion 38 of the movable scroll.

Bearing 62 includes plate 63 fixed to the housing and plate 65 connected to the movable scroll. Balls 67, which are received in openings in plates 63 and 65, react against thrust rings 69 and 691 as they orbit in the openings. The motion of the movable scroll is not unlike the motion that would be generated by a well known Oldham coupling.

A suction pressure passage leading to the compression chambers defined by the scrolls is shown by means of dotted lines in FIG. 1 at 68.

In the conventional compressor design of FIG. 1, the end plate 18 carries a fixed sleeve or nose 70 having a machined outer cylindrical surface 72 and a machined inner cylindrical surface 74. Surface 72 is a mounting surface for the inner race of pulley bearing assembly 76 for a compressor driveshaft drive pulley 78. The nose 70 defines a sleeve that acts as a bearing support for the bearing 80 for driveshaft 54 and as a bearing support for the bearing 76.

Pulley 78 encloses electromagnetic coil windings 82 which surround the hub 84 of the pulley.

The pulley 78 includes a radial portion having a friction clutch surface 86 situated directly adjacent a friction clutch engagement plate 88. Driveshaft 54 is connected drivably to the engagement plate 88 through a drive spring arrangement 90.

It is necessary in the pulley and clutch assembly of FIG. 1 for precise machining operations to be made to locate properly the bearing seat for the shaft bearing 80 and for the pulley bearing 76. This precision machining operation must occur so that the bearing surfaces are formed to precise diametric limits and to precise concentricity, one with respect to the other.

Figure 2:
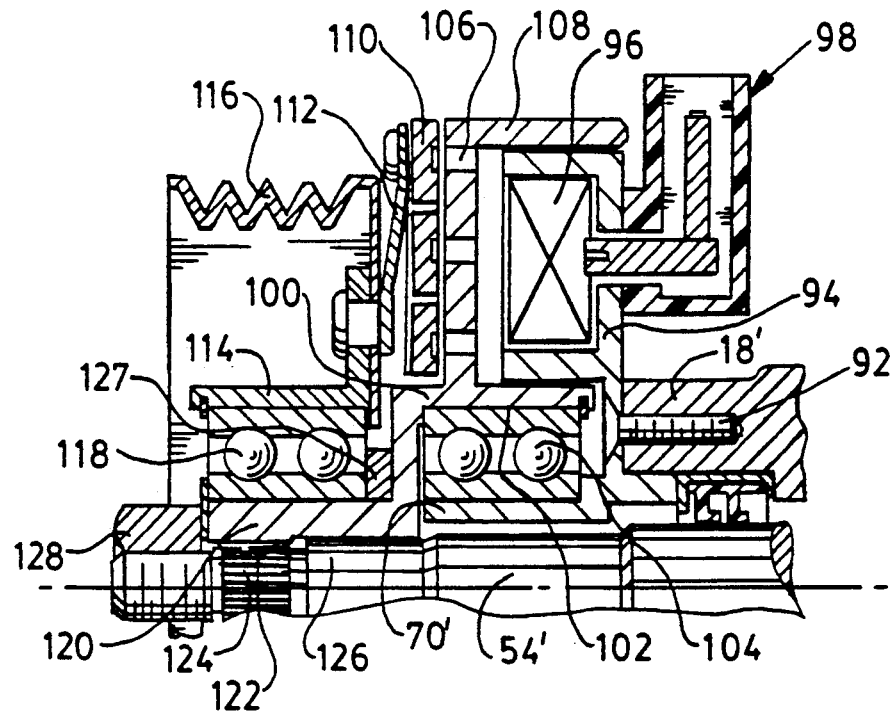
FIG. 2 is a cross-sectional view similar to the cross-sectional view of FIG. 1 showing the improved clutch and pulley bearing arrangement of my invention.

The improved clutch and bearing assembly of my present invention is illustrated in FIG. 2. The end plate 18', as shown in FIG. 2, has a cylindrical nose portion or sleeve 70'. For purposes of this description, elements in the FIG. 2 construction that have counterpart elements in the FIG. 1 construction have been identified by similar reference numerals, although prime notations are added.

Sleeve 70', as seen in FIG. 2, is secured to housing 18' by screws 92. Sleeve 70' includes a radially extending support plate 94 which forms a housing for electromagnetic clutch coil windings 96. An electrical connector 98 is secured to the housing 94 and provides an electrical lead for supplying voltage to the windings 96.

A bearing support 100 has a bearing opening 102 which receives ball bearing assembly 104. The inner race of the ball bearing assembly 104 is supported on sleeve 70'.

Preferably, the bearing assembly 104 comprises two spaced ball bearing units having a common outer race located within the opening 102. Support 100 includes a friction clutch plate 106 which is joined at its radially outward extremity to metallic electromagnetic clutch ring 108.

A clutch engagement plate 110 is disposed adjacent the plate 106. It is joined by means of a resilient spring coupling 112 to the hub 114 of a drive pulley 116. The drive pulley 116 is journalled by compound bearing assembly 118 on an extension 120 formed on the bearing support 100. The extension 120 has internal splines 122 which register with a splined portion 124 of driveshaft 54'. Extension 120 is piloted on a pilot portion 126 of the shaft 54'.

A spacer washer 127 is located between the inner race of bearing 118 and an adjacent shoulder on support 102. This washer allows control of the air gap between the engagement plate 110 and friction clutch plate 106.

A retainer nut 128 is threaded on the end of the shaft 54' for retaining the bearing support 100 axially fast.

The driveshaft 54' is journalled by the same bearing assembly 118 that supports the pulley 116. Preferably, the bearing assembly 118 comprises two separate bearing units arranged in tandem.

The front shaft bearing for the driveshaft 54' is complemented by a second bearing of the kind shown at 58 in FIG. 1 to provide a straddle mounting. In this arrangement, the pulley 116 is located adjacent the electromagnetic clutch elements. Its diameter can be chosen to satisfy the particular requirements for the compressor as the compressor is matched to an engine having a particular speed/torque characteristic. A smaller diameter pulley 116 can be used in this arrangement than in an arrangement of the kind shown in FIG. 1 where it is necessary to locate the clutch engagement plate at the outboard end of the shaft and to locate the pulley in radial disposition with respect to the electromagnetic clutch coil windings and clutch bearings.

The radial belt loads on the pulley 116 are transferred through the bearing 118 and hence through the bearing support 100 and the bearing assembly 104 to the compressor housing. Belt loads, thus, are not transmitted directly to the shaft 54'.

Figure 3:
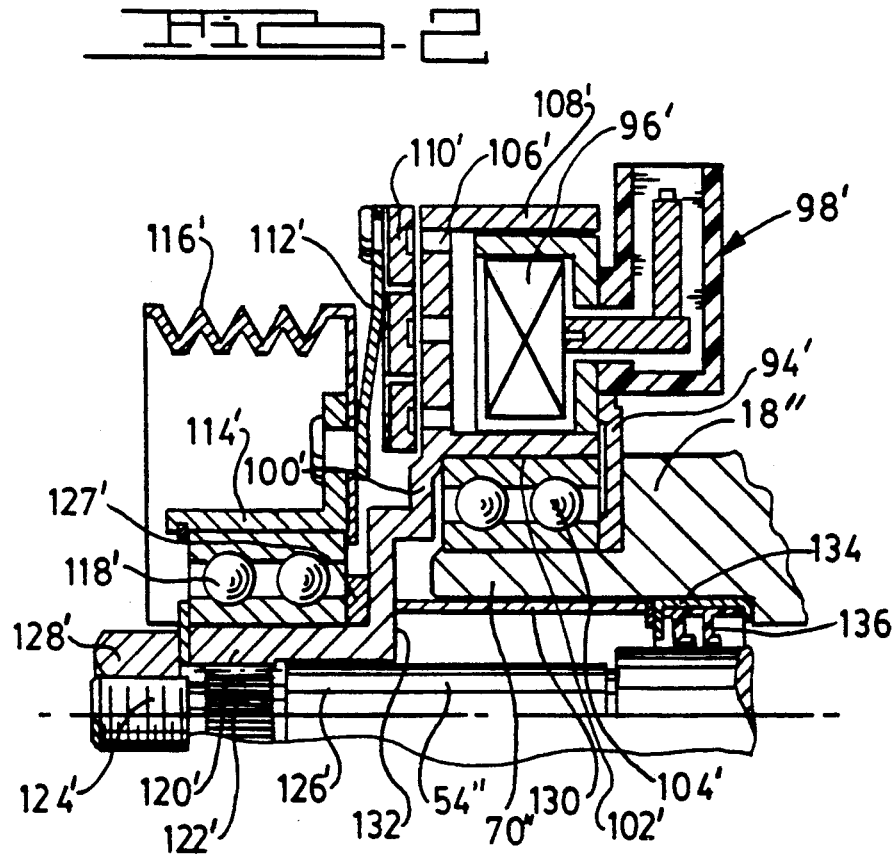
FIG. 3 is an alternate embodiment of the improved bearing arrangement of FIG. 2.

In the alternate embodiment of FIG. 3, the elements that are common to the embodiment of FIG. 2 have been indicated by similar reference characters, but prime notations are added. In the embodiment of FIG. 3, a spacer tube 130 surrounds the shaft 54" and engages reaction shoulder 132 formed on the bearing support 100'. The opposite end of the tube 130 engages spacer 134 which encloses rotary seal 136. When the clamping nut 128' is tightened during assembly, the bearings 104 and the bearings that support the shaft 54" are loaded with a preload, thus eliminating excessive bearing tolerance following assembly. The tube 130 also prevents a preload from becoming excessive because of inadvertent excessive tightening of the nut 128'.

Having described preferred embodiments of my invention, what I claim and desire to secure by United States Letters Patent is:

1. A compressor for compressing refrigerant gas in an air conditioning system for a vehicle having an engine comprising a compressor housing, pumping elements in said housing, said housing having a flow inlet port and a flow delivery port, said pumping elements being adapted to compress refrigerant gas received through said inlet port and to discharge compressed refrigerant gas through said delivery port;

a bearing support sleeve located on said housing, a bearing support member having a radial clutch plate joined thereto, electromagnetic clutch coil windings carried by said housing adjacent said clutch plate;

first bearing means for journalling said bearing support member on said sleeve;

a drive pulley located in axially spaced relationship with respect to said clutch plate;

a clutch actuator plate connected to said pulley and located between said pulley and said clutch plate, said actuator plate having a resilient connection to said pulley;

a torque input driveshaft extending through said sleeve and being connected to one of said pumping elements, said driveshaft being drivably connected to said bearing support member; and second bearing means for journalling said drive pulley on said bearing support member.

2. The combination as set forth in claim 1 wherein the diameter of said pulley is less than the diameter of said clutch actuator plate, the pulley loads on said pulley being transferred through said second bearing means to said bearing support and from said bearing support to said sleeve through said first bearing means.

3. The combination as set forth in claim 2 wherein said first bearing means and said second bearing means comprise compound ball bearing assemblies, each bearing assembly having two bearing units with common inner and outer races, thereby providing stability for said pulley and said support member.

* * * * *